(12) United States Patent
Qi

(10) Patent No.: US 7,748,859 B2
(45) Date of Patent: Jul. 6, 2010

(54) BACKLIGHT MODULE HAVING GRATING PLATE AND LIQUID CRYSTAL DISPLAY WITH SAME

(75) Inventor: Xiao-Jing Qi, Shenzhen (CN)

(73) Assignees: Innocom Technology (Shenzhen) Co., Ltd., Shenzhen, Guangdong Province (CN); Innolux Display Corp., Miao-Li County (TW)

( * ) Notice: Subject to any disclaimer, the term of this patent is extended or adjusted under 35 U.S.C. 154(b) by 147 days.

(21) Appl. No.: 12/005,799

(22) Filed: Dec. 27, 2007

(65) Prior Publication Data

US 2008/0158479 A1 Jul. 3, 2008

(30) Foreign Application Priority Data

Dec. 29, 2006 (TW) .............................. 95149678 A

(51) Int. Cl.
*F21V 9/14* (2006.01)
*F21V 7/04* (2006.01)
*F21V 11/02* (2006.01)
*F21V 7/00* (2006.01)
*G02F 1/1335* (2006.01)

(52) U.S. Cl. ..................... 362/19; 362/623; 362/290; 362/342; 349/62; 349/66

(58) Field of Classification Search .............. 362/608, 362/609, 623, 624, 625, 290, 342, 19; 349/62, 349/66
See application file for complete search history.

(56) References Cited

U.S. PATENT DOCUMENTS

| 5,786,931 | A | * | 7/1998 | Speckbacher et al. | 359/572 |
| 5,982,540 | A | * | 11/1999 | Koike et al. | 359/487 |
| 6,122,103 | A | * | 9/2000 | Perkins et al. | 359/486 |
| 6,880,953 | B2 | | 4/2005 | Shin | |
| 7,046,318 | B2 | * | 5/2006 | Yu et al. | 349/64 |
| 7,242,838 | B2 | * | 7/2007 | Yu et al. | 385/129 |
| 7,252,424 | B2 | * | 8/2007 | Hsu et al. | 362/600 |
| 7,614,757 | B2 | * | 11/2009 | Nesterenko et al. | 362/19 |
| 2004/0207775 | A1 | * | 10/2004 | Min et al. | 349/65 |
| 2007/0076417 | A1 | * | 4/2007 | Yang et al. | 362/458 |
| 2009/0040608 | A1 | * | 2/2009 | Tsai et al. | 359/487 |

FOREIGN PATENT DOCUMENTS

CN 1588196 A 3/2005
CN 2769942 Y 4/2006

* cited by examiner

*Primary Examiner*—Jong-Suk (James) Lee
*Assistant Examiner*—David R Crowe
(74) *Attorney, Agent, or Firm*—Wei Te Chung

(57) ABSTRACT

A backlight module (1) includes a light source (121), a light guide plate (122) and a grating plate (123). The light guide plate includes a light incident surface (1221), a bottom surface (1223) adjacent the light incident surface. The light source is provided adjacent to the light incident surface of the light guide plate. The grating plate is provided adjacent to the bottom surface of the light guide plate. The grating plate is configured for reflecting light beams and polarizing the light beams.

9 Claims, 3 Drawing Sheets

BACKLIGHT MODULE HAVING GRATING PLATE AND LIQUID CRYSTAL DISPLAY WITH SAME

FIELD OF THE INVENTION

The present invention relates to backlight modules used in liquid crystal displays, and more particularly to a backlight module including a grating plate and a liquid crystal display using the backlight module.

GENERAL BACKGROUND

Liquid crystal displays are commonly used as display devices for compact electronic apparatuses. This is because they not only provide good quality images but also are very thin. Because liquid crystal molecules in a liquid crystal display do not emit any light themselves, the liquid crystal molecules have to be lit by a light source so as to clearly and sharply display text and images.

Referring to FIG. 4, a typical liquid crystal display 4 includes a liquid crystal panel 41 and a backlight module 42 adjacent to the liquid crystal panel 41. The backlight module 42 is configured for providing light beams for the liquid crystal panel 41.

The liquid crystal display 4 includes a color filter substrate 411, a thin film transistor (TFT) substrate 412 opposite to the color filter substrate 411, a liquid crystal layer 413 sandwiched between the color filter substrate 411 and the TFT substrate 412, a first polarizer 414 disposed on an outer surface of the color filter substrate 411 and a second polarizer 415 disposed on an outer surface of the TFT substrate 412. The first polarizer 414 has a first polarization direction. The second polarizer 415 has a second polarization direction perpendicular to the first polarization direction of the first polarizer 414.

The backlight module 42 includes a light source 421, a light guide plate 422 and a reflective plate 423. The light guide plate 422 includes a light incident surface 4221, a light emitting surface 4222 and a bottom surface 4223 opposite to the light emitting surface 4222. The light emitting surface 4222 and the bottom surface 4223 are both perpendicularly connected with the light incident surface 4221. The light source 421 is disposed adjacent to the light incident surface 4221 of the light guide plate 422. The reflective plate 423 is disposed adjacent to the bottom surface 4223 of the light guide plate 422.

Light beams emitted from the light source 421 enter the light guide plate 422 through the light incident surface 4221, and propagate in the light guide plate 422. A majority of the light beams are emitted out from the light emitting surface 4222 and are utilized by the liquid crystal panel 41. A minority of light beams transmit out from the bottom surface 4223, and reach the reflective plate 423. These light beams are reflected by the reflective plate 423 and transmit back into the light guide plate 422 again.

However, the second polarizer 415 has a second polarization direction to allow light beams having a polarization direction parallel to the second polarization direction to transmit through. The transmitted light beams are difined as P-ray. Other light beams having polarization directions which are not parallel to the second polarization direction of the second polarizer 415 can not transmit through the second polarizer 415. The light beams reflected by the reflective plate 423 are unpolarized and can be devided into 50% P-ray and 50% other rays. Only the P-ray has a polarization direction parallel to the second polarization direction of the second polarizer 415. Therefore, only 50% P-ray of the reflected light beams can transmit through the second polarizer 415 and be utilized. Thus, a utilizing efficiency of the reflected light beams is only 50%. The low light utilizing efficiency becomes a serious problem of the liquid crystal display 4.

What is needed, therefore, is a backlight module that can overcome the above-described deficiencies. What is also needed, is a liquid crystal display including such backlight module.

SUMMARY

In one preferred embodiment, a backlight module includes a light guide plate, a light source and a grating plate. The light guide plate includes a light incident surface, a bottom surface adjacent the light incident surface. The light source is provided adjacent to the light incident surface of the light guide plate. The grating plate is provided adjacent to the bottom surface of the light guide plate. The grating plate is configured for reflecting light beams and polarizing the light beams.

Other novel features, advantages and aspects will become more apparent from the following detailed description when taken in conjunction with the accompanying drawings.

DETAILED DESCRIPTION OF PREFERRED EMBODIMENTS

Reference will now be made to the drawings to describe the preferred embodiments in detail.

Figure 1:
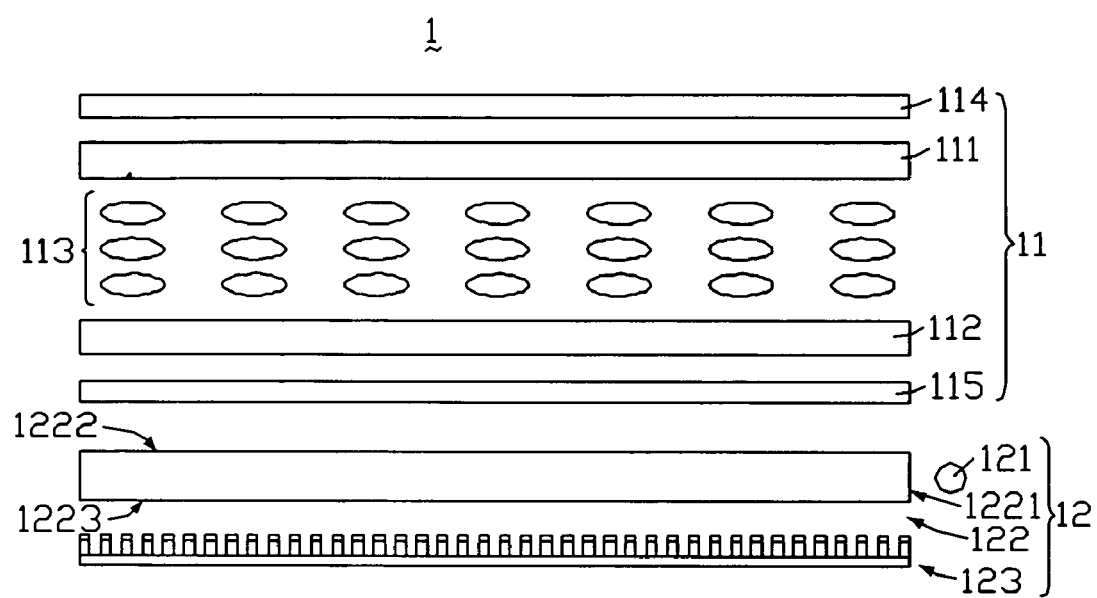
FIG. 1 is a schematic, side view of a liquid crystal display according to an exemplary embodiment of the present invention, the liquid crystal display including a backlight module, the backlight module including a grating plate.

Referring to FIG. 1, a liquid crystal display 1 according to an exemplary embodiment of the present invention is shown. The liquid crystal display 1 includes a liquid crystal panel 11 and a backlight module 12 adjacent to the liquid crystal panel 11. The backlight module 12 is configured for providing light beams for the liquid crystal panel 11.

The liquid crystal panel 11 includes a color filter substrate 111, a thin film transistor (TFT) substrate 112, a liquid crystal layer 113 sandwiched between the color filter substrate 111 and the TFT substrate 112, a first polarizer 114 disposed on an outer surface of the color filter substrate 111 and a second polarizer 115 disposed on an outer surface of the TFT substrate 112. The first polarizer 114 has a first polarization axis. The second polarizer 115 has a second polarization axis perpendicular to the first polarization axis of the first polarizer 114.

The backlight module 12 includes a light source 121, a light guide plate 122 and a grating plate 123. The light guide plate 122 includes a light incident surface 1221, a light emitting surface 1222 and a bottom surface 1223 opposite to the light emitting surface 1222. The light emitting surface 1222 and the bottom surface 1223 are both perpendicularly connected with the light incident surface 1221. The grating plate 123 is located under the bottom surface 1223 of the light guide plate 122. The light source 121 is located adjacent to the light incident surface 1221 of the light guide plate 122. The light source 121 can be a cold cathode fluorescence lamp (CCFL).

Figure 2:
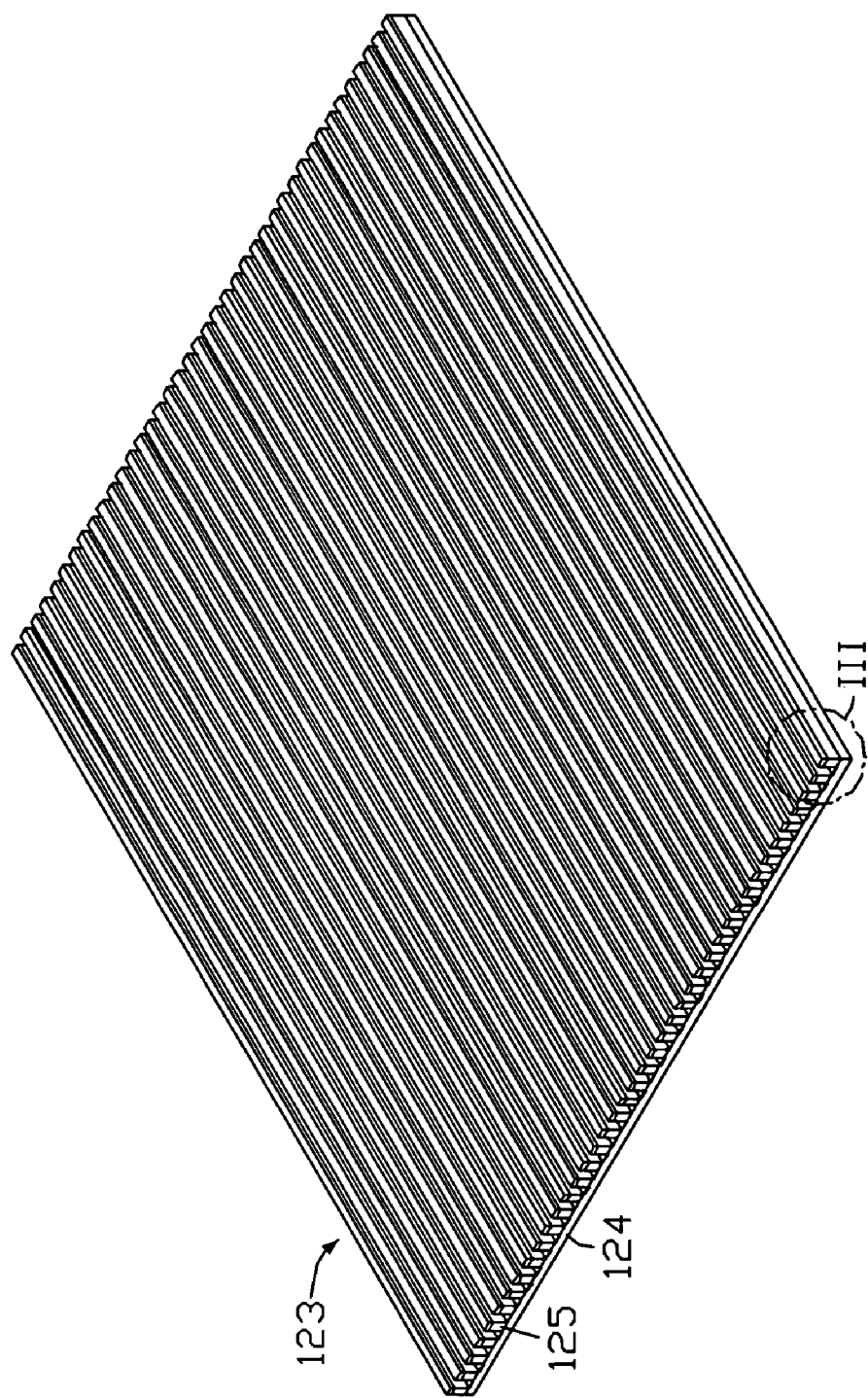
FIG. 2 is an isometric view of the grating plate of FIG. 1.
Figure 3:
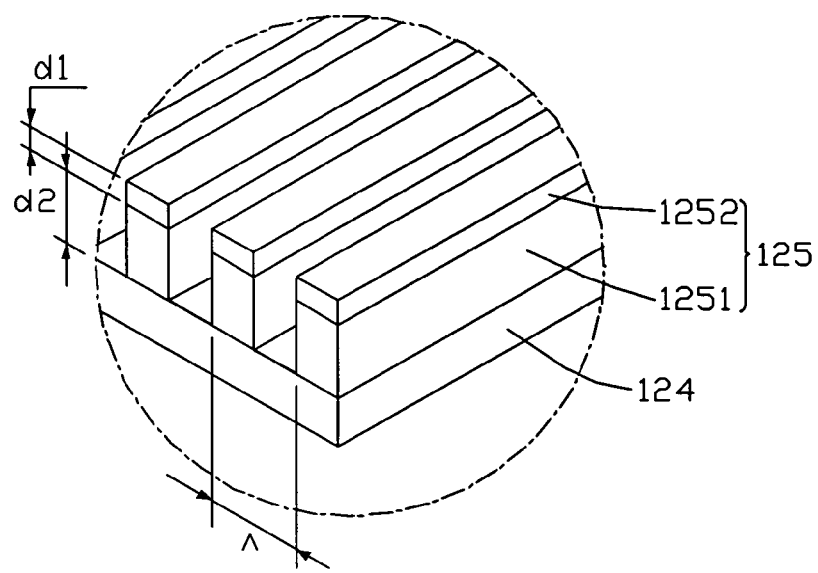
FIG. 3 is an enlarged view of a circle portion III of FIG. 2.
Figure 4:
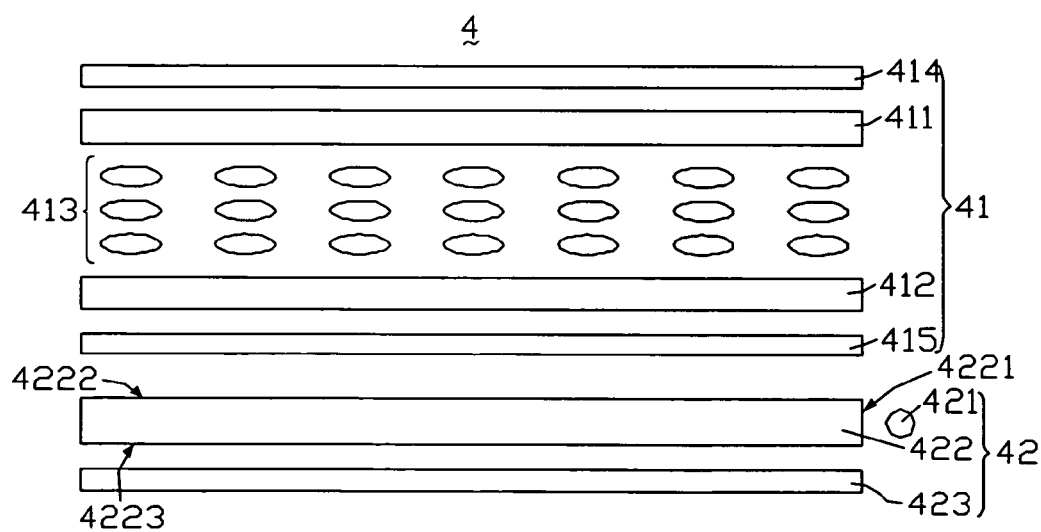
FIG. 4 is an exploded, isometric view of a conventional liquid crystal display.

Referring also to FIG. 2 and FIG. 3, the grating plate 123 includes a base plate 124 and a plurality of sub-wavelength gratings 125 formed on an inner surface of the base plate 124. The sub-wavelength gratings 125 are reflecting diffractive gratings. The sub-wavelength gratings 125 are parallel to each other and have rectangular sectional shapes. The extending directions of the sub-wavelength gratings 125 are parallel to the second polarization axis of the second polarizer 115. The sub-wavelength gratings 125 are arranged in a grating period Λ. The grating period Λ is less than wavelengths of incident light beams from the light source 121.

Each sub-wavelength grating 125 includes a dielectric layer 1251 extending upwardly from the base plate 124 and a metal layer 1252 formed on the dielectric layer 1251. The metal layer 1252 is made of materials with a high reflective ratio, and has a height d1. The dielectric layer 1251 is made from silicon dioxide, and has a height d2.

Since the grating period Λ of the sub-wavelength gratings 125 is less than wavelengths of the incident light beams, the sub-wavelength gratings 125 only transmit zero-order reflected light beams. That is, the sub-wavelength gratings 125 function as equivalent mediums. As explained by the effective-medium theory and the rigorous couple-wave theory, if the grating period Λ of the sub-wavelength gratings 125, the metal layer height d1 and the dielectric layer height d2 are set at proper values, the sub-wavelength gratings 125 can polarize the light beams.

In the illustrated embodiment, the grating period Λ of the sub-wavelength gratings 125 is 0.2 times as long as a wavelength of the incident light beams. The metal layer height d1 is 0.139 times as long as the wavelength of the incident light beams. The dielectric layer 1251 height d2 is 0.275 times as long as the wavelength of the incident light beams. That is, the grating plate 123 reflects nonpolarized incident light beams and polarizes a majority of the nonpolarized incident light beams to polarized light beams having a polarization direction parallel to the extending directions of the sub-wavelength gratings 125. The polarization axis of the second polarizer 115 is also parallel to the extending directions of the sub-wavelength gratings 125. The sub-wavelength gratings 125 can polarize 92.5% of the incident light beams to polarized light beams having polarization directions parallel to the polarization axis of the second polarizer 115.

When the liquid crystal display 1 works, light beams emitted from the light source 121 enter the light guide plate 122 and propagate in the light guide plate 122. Some light beams are emitted out from the light emitting surface 1222 of the light guide plate 122 and are utilized by the liquid crystal panel 11. Some light beams are emitted out from the bottom surface 1223 of the light guide plate 122 and reach the grating plate 123. A majority of these light beams (about 92.5%) are reflected by the sub-wavelength gratings 125 and are polarized to polarized light beams having polarization directions parallel to the polarization axis of the second polarizer 115. These light beams reach the second polarizer 115 through the light guide plate 122, and all transmit through the second polarizer 115. Therefore, 92.5% of the light beams that are emitted out from the bottom surface 1223 of the light guide plate 122 are utilized again by reflection of the grating plate 123.

Unlike conventional liquid crystal displays, the backlight module 12 includes the grating plate 123 to polarize a majority of light beams that are emitted out from the bottom surface 1223 of the light guide plate 122 to have polarization directions parallel to the polarization axis of the second polarizer 115. These reflected light beams all transmit through the second polarizer 115 and are utilized. Thus, the utilization of light beams of the backlight module 12 and the liquid crystal display 1 is increased, and the brightness of backlight module 12 and the liquid crystal panel 1 is accordingly increased.

Further or alternative embodiments may include the following. In one embodiment, the grating period Λ of the sub-wavelength gratings 125, the height d1 of the metal layer 1252 and the height d2 of the dielectric layer 1251 can be set at other proper values, provided that polarization directions of a majority of reflected light beams are polarized to be parallel to a polarization direction of a second polarizer.

It is to be understood, however, that even though numerous characteristics and advantages of the present embodiments have been set out in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A backlight module comprising:
   a light guide plate comprising a light incident surface, a top surface adjacent to the light incident surface, and a bottom surface adjacent to the light incident surface,
   a light source provided adjacent to the light incident surface of the light guide plate, and
   a grating plate provided adjacent to the bottom surface of the light guide plate, the grating plate comprising a base plate and a plurality of sub-wavelength gratings arranged on a surface of the base plate facing the light guide plate, the sub-wavelength gratings reflecting light beams directly to the bottom surface the light guide plate and polarizing the light beams, the reflected light beams are polarized to have parallel polarized directions by the sub-wavelength gratings, are transmitted through the light guide plate, and are directly emitted out of the top surface of the light guide plate, wherein the sub-wavelength gratings are parallel to each other and arranged in a grating period Λ, and the grating period Λ of the sub-wavelength gratings is in a range from about 0.08 μm to about 0.14 μm.

2. The backlight module as claimed in claim 1, wherein each of the sub-wavelength gratings comprises a dielectric layer extending from a surface of the base plate facing the light guide plate and a metal layer provided on a surface of the dielectric layer facing the light guide plate.

3. The backlight module as claimed in claim 2, wherein the dielectric layer is made from silicon dioxide.

4. The backlight module as claimed in claim 2, wherein a height d1 of the metal layer is in a range from about 0.0556 μm to about 0.0973 μm, and a height d2 of the dielectric layer is in a range from about 0.11 μm to about 0.1925 μm.

5. A liquid crystal display comprising a liquid crystal panel and a backlight module parallel to the liquid crystal panel, the backlight module comprising:
   a light guide plate comprising a light incident surface, a top surface adjacent to the light incident surface, and a bottom surface adjacent to the light incident surface,
   a light source provided adjacent to the light incident surface of the light guide plate, and
   a grating plate provided adjacent to the bottom surface of the light guide plate, the grating plate comprising a base plate and a plurality of sub-wavelength gratings arranged on a surface of the base plate facing the light guide plate, the sub-wavelength gratings reflecting light beams directly to the bottom surface of the light guide plate and polarizing the light beams, the reflected light beams are polarized to have parallel polarized directions by the sub-wavelength gratings, are transmitted through the light guide plate, and are directly emitted out of the top surface of the light guide plate to be provided to the liquid crystal panel, wherein the sub-wavelength gratings are parallel to each other and arranged in a grating period $\Lambda$, and the grating period $\Lambda$ of the sub-wavelength gratings is in a range from about 0.08 μm to about 0.14 μm.

6. The liquid crystal display as claimed in claim 5, wherein each of the sub-wavelength gratings comprises a dielectric layer extending from a surface of the base plate facing the light guide plate and a metal layer provided on a surface of the dielectric layer facing the light guide plate.

7. The liquid crystal display as claimed in claim 6, wherein the dielectric layer is made from silicon dioxide.

8. The liquid crystal display as claimed in claim 6, wherein a height $d_1$ of the metal layer is in a range from about 0.0556 μm to about 0.0973 μm, and a height $d_2$ of the dielectric layer is in a range from about 0.11 μm to about 0.1925 μm.

9. The liquid crystal display as claimed in claim 5, wherein the liquid crystal panel further comprises a polarizer adjacent to the backlight module, and a polarization axis of the polarizer is parallel to polarization directions of the light beams reflected by the grating plate.

\* \* \* \* \*